L. B. WISE.
VARIABLE SPEED TRANSMISSION MECHANISM.
APPLICATION FILED JUNE 28, 1915.

1,173,993.

Patented Feb. 29, 1916.
2 SHEETS—SHEET 1.

Witnesses,
George E. Marlatt
Charles H. Wild

Inventor
Leon B. Wise
By
Attorney.

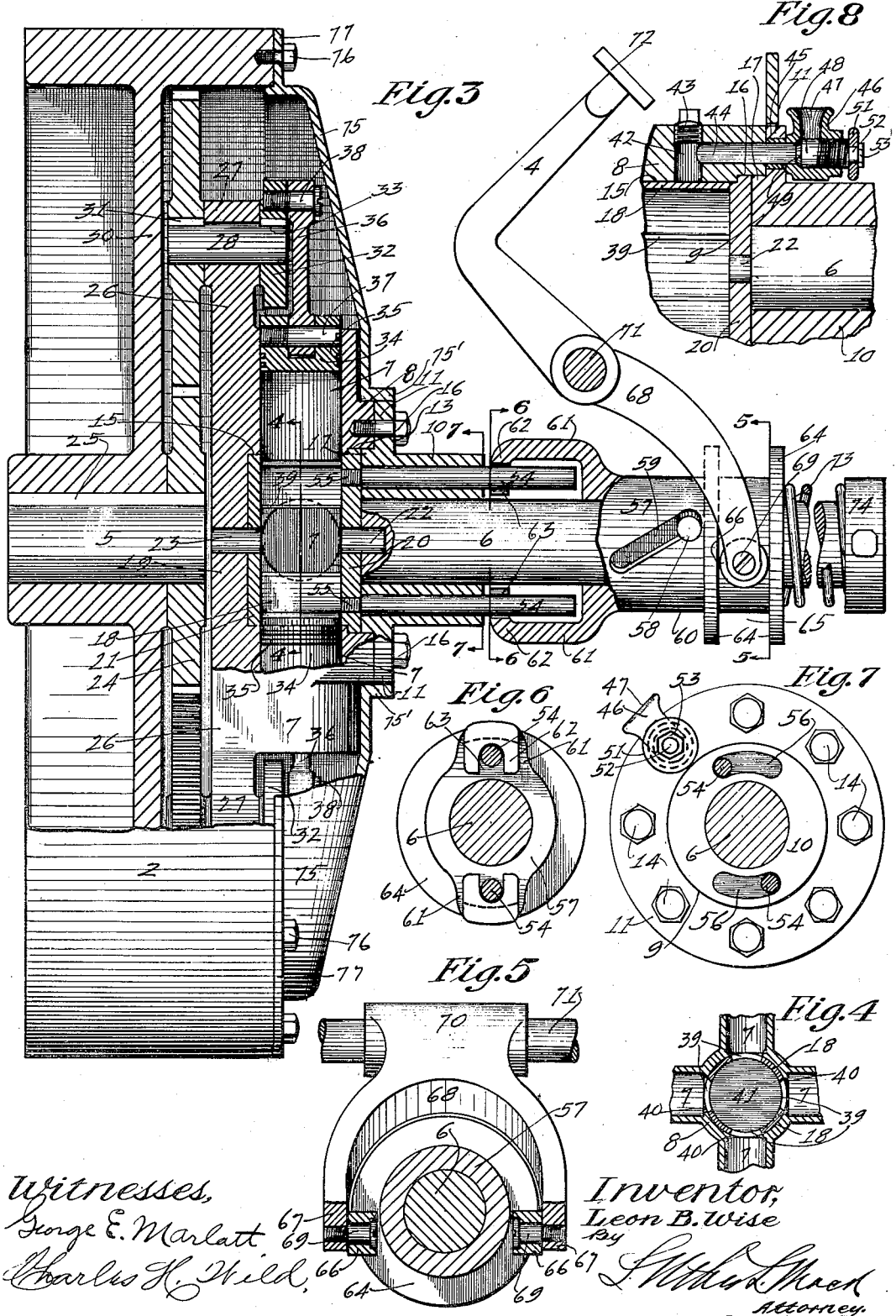

UNITED STATES PATENT OFFICE.

LEON B. WISE, OF LOS ANGELES, CALIFORNIA.

VARIABLE-SPEED-TRANSMISSION MECHANISM.

1,173,993.  Specification of Letters Patent.  Patented Feb. 29, 1916.

Application filed June 28, 1915. Serial No. 36,879.

*To all whom it may concern:*

Be it known that I, LEON B. WISE, a citizen of the United States, residing at Los Angeles, in the county of Los Angeles and State of California, have invented a new and useful Improvement in Variable-Speed-Transmission Mechanism, of which the following is a specification.

My invention relates to clutch mechanisms for automobiles or motor propelled vehicles and the primary object thereof is to provide a combined clutch and brake mechanism of a positive action, non-frictional type.

A further object is to provide a liquid or oil displacing clutch means comprising a plurality of integrally cast cylinders having gear operated pistons for displacing the liquid, together with improved means for regulating the application of motive power from the engine to the transmission mechanism and means for supplying and removing the liquid to and from the cylinders for the purpose of cleaning.

Other objects may appear in the subjoined detailed description.

Figure 1:
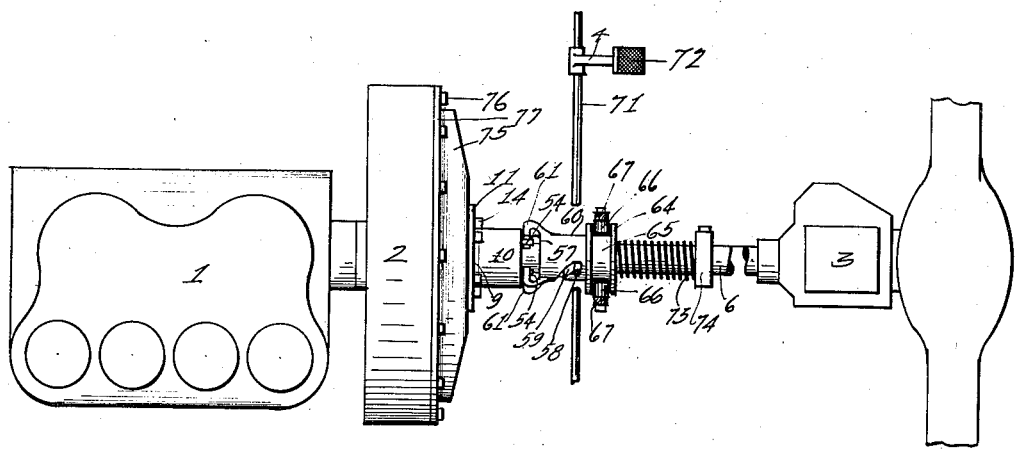
Figure 2:
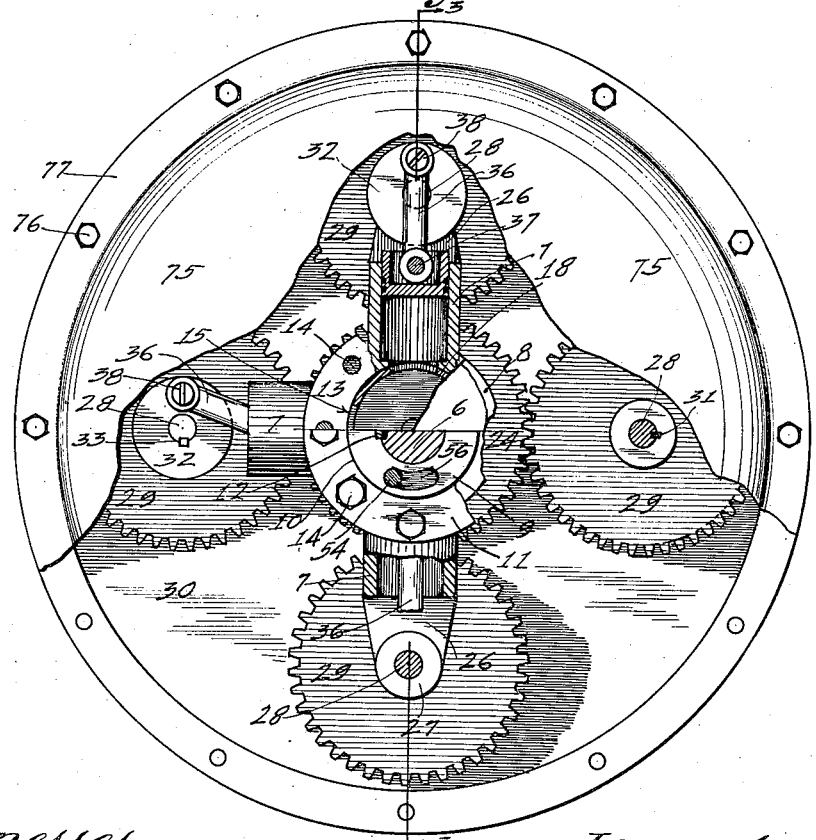

Referring to the drawings, in which similar characters of reference indicate the same parts throughout the several views, Figure 1 is a plan of my improved clutch mechanism applied to the engine and transmission means of an automobile; Fig. 2 is a composite sectional view, in elevation, of the clutch means applied to the fly wheel of the engine, the various sections being taken in different planes and fragmentary in character in order to clearly illustrate the several elements thereof; Fig. 3 is an elevation of the same in section on the line 3—3 of Fig. 2; Fig. 4 is a reduced transverse section of the liquid chamber, valves and cylinders; Fig. 5 is a transverse section on the line 5—5 of Fig. 3; Fig. 6 is a transverse section on the line 6—6 of Fig. 3; Fig. 7 is a transverse section on the line 7—7 of Fig. 3; and Fig. 8 is a fragmentary longitudinal section of the central portion of the clutch showing the liquid injecting and discharging means.

As indicated on the drawings, my invention is designed to be applied directly to the engine fly wheel and to be operated thereby for supplying motive power to the vehicle through the transmission mechanism, by means of a central gear suitably keyed to the engine crank shaft. A plurality of other gears of substantially the same size are grouped at regular intervals around and in mesh with the fly wheel gear and serve to operate pistons which operate in a group of radially disposed displacement cylinders, the details of the structure of which and other associated elements I will now describe.

The relative location of the engine 1 and its fly wheel 2, the transmission mechanism 3, the clutch operating means 4 and my improved clutch and brake, is shown in Fig. 1. The fly wheel 2 is mounted, as usual on the end of the engine crank shaft 5 and revolves therewith and the transmission mechanism is carried on the longitudinal shaft 6 which is alined with the crank shaft 5. I provide a plurality of integral cast cylinders 7 which radiate at regular intervals from the central body 8 carried rigidly on the shaft 6. A suitable head 9 with the hub 10 and the flange 11 is keyed to the end of the shaft 6 by means of a key or feather 12 and is secured rigidly to the face 13 of the body 8 by means of bolts 14. The center of the body 8 has a relatively large bore 15 which is common to all of the cylinders 7 and communicates therewith, and the outer side of the body 8 is counterbored at 16 to receive the extension 17 of the head 9. A cylindrical valve 18 is inserted in the bore 15 and is pivotally held therein between the rear wall 19 and the extension 17 of the head 9. The front wall 20 and the rear wall 21 of the valve are solid, except for suitable bores to receive the short shafts 22 and 23, the former being journaled in the end of the shaft 6 and the latter in the rear wall 19 of the body so that the valve may be rotated.

The crank shaft 5 is extended inwardly in the fly wheel 2 and carries a gear 24 which is held thereon by means of the key 25. Arms 26 are formed on the rear portions of the cylinders 7 and are provided at their outer ends with the bearings 27. Shafts 28 are journaled in the bearings 27 and carry gears 29 on their ends adjacent to the fly wheel web 30, the gears being held rigidly on the shafts by the keys 31, and disk cranks 32 are likewise held on the opposite ends of the shafts by the keys 33. The gears 29 are constantly in mesh with the central fly wheel gear 24 and are adapted to be driven by this gear when the fly wheel is rotated. Pistons 34 having suitable rings 35 are slidable in the cylinders 7 and piston rods 36 are pivotally held at one end in the pistons on pins 37 while the other and outer ends of the rods are pivoted to the crank disks 32 on pins 38.

The valve 18 is common to all of the cylinders 7 and is provided with the rectangular ports 39 in the periphery thereof which register with ports 40 of similar area and form in the inner ends of the cylinders, the relative area of the ports being practically or but slightly less than that of the cylinders. A supply of oil or liquid is adapted to be placed in the body 8 and a sufficient quantity thereof to completely fill the chamber 41 and the cylinders, and in order that the supply of liquid may be easily replenished or removed from the chamber and cylinders, I provide the means shown in Figs. 7 and 8. A radial bore 42 is made in the body 8 at a convenient point between the cylinders 7 and the outer portion of the bore is threaded to receive the plug 43. A longitudinal bore 44 is made in the body 8 which communicates with the bore 42, and one of the cap screws or bolts 14 is omitted from the flange 11 of the head 9 and a bore which registers with the bore 44 is made in the flange and is suitably threaded to receive the neck 45 of the injector housing 46.

The injector has a flared mouth 47 at the top to receive the oil or liquid and a valve stem 48 is threaded therein which has the tapered end 49 adapted to seat in the end of the bore 50 in the housing 46. A hand wheel 51 is secured to the reduced and flattened end 52 of the stem 48 and is held thereon by means of a nut 53. The liquid may be poured into the mouth of the injector when the valve is open, and it will flow through the bores 42 and 44 and thence into the chamber 41, provided the ports 39 are not in registration with those 40 in the cylinders, or, if desirable an opening of the valve 18 to a partial extent will suffice to admit the liquid into all of the cylinders. This valve may be also used to remove the liquid from the cylinders by turning the fly wheel over so that the mouth thereof will be directed toward the ground, when, in the event that the hand wheel is turned so as to open the valve, the liquid will flow out of the cylinders and chamber 41.

As shown in Fig. 2, it is preferable that the pistons 34 be arranged on the quarters of the crank 32, so that a dead center will in all cases be insured against. It is also preferable that the number of cylinders should always be of an even number so that they may be paired, as shown, one piston of a pair moving outwardly from the center of the chamber 41 while the other moves inwardly in its cylinder. Thus the liquid which is contained within the cylinders and the chamber 41, when the pistons are in motion, is displaced from one cylinder of a pair into the opposite cylinder, and the size of the chamber 41 is of necessity sufficient to overcome, or in fact prevent, an interference between the two or more opposing forces caused by the displacement of the liquid in more than one direction.

The valve 18 is provided with a pair of oppositely mounted and outwardly extended rods 54 which are secured in the front wall 20 of the valve by means of the reduced and threaded ends 55, and the outer ends are slidable in the circumferentially formed slots 56 in the hub 9. A sleeve 57 is slidably and pivotally carried on the shaft 6 by means of a pin 58 secured to the shaft and which projects outwardly therefrom into engagement with a diagonal slot 59 in the hub 60 of the sleeve. Arms 61 are formed on opposite portions of the sleeve and extend outwardly from the sleeve to a point adjacent to the end of the head 9 where they are provided with the inwardly turned ends 62 having slots 63 which engage the outer ends of the valve rods 54. The opposite end of the sleeve 57 has a pair of flanges 64 forming an annular groove 65 in which a pair of oppositely positioned rollers 66 are adapted to operate. The rollers are carried on the lower ends 67 of the yoke 68 and are revolubly held on the pins 69 secured therein, the upper and central portion 70 of the yoke being rigidly secured to the shaft 71 which is commonly used on vehicles of this type for mounting the clutch actuating mechanism. A clutch pedal 72 of the usual form and arrangement is held on one end of the shaft 71 for effecting the movement of the shaft and the operation of my clutch. A spring 73 is carried by the shaft 6 between the rear flange 64 and the collar 74 for normally holding the elements in the position shown in Fig. 3.

When the clutch pedal 72 is depressed by the foot of the operator, the yoke 70 moves the sleeve 57 outwardly from the head 9 and against the tension of the spring 73, the engagement of the pin 58 and the slot 59 effects a pivotal movement of the sleeve simultaneously with the longitudinal movement, and the valve 18 is turned in the bore 15 sufficiently to move the ports 39 therein out of registration either wholly or partially with the ports 40 in the cylinders 7, the extent of movement of the valve 18 being determined by the pressure on the pedal 72. The ports in the valve and the cylinders are normally in registration so that a free and unobstructed passage of the liquid may be permitted. In such event, the resistance to the passage of the liquid being at the minimum, the pistons will operate freely in their cylinders 7 and the gears 29 will be rotated on rather than with the central gear 24, inasmuch as the effort exerted on the gears 29 will not be sufficient to rotate the entire set of gears, cranks, pistons and cylinders as a unit. As the valve 18 is closed and the area of the ports gradually diminished, the resistance to the flow or displacement of the liquid becomes greater until the entire mechanism as a unit revolves with the fly wheel and the operation of the pistons is stopped because of the failure of the gears 29 to rotate on the gear 24. It is obvious that there being four cylinders shown, the extent of movement of the valve 18 to accomplish a total closing of the ports is equal to slightly more than one eighth of a revolution, inasmuch as the ports are slightly less than one eighth of the periphery in extent and the clearance is slightly more than one eighth in order to insure a total closing of the passage.

This mechanism may be used and is intended for use as a braking means for steep inclines or otherwise, and when so used, the transmission gears may be shifted into the reverse, for instance, the pedal 72 may be depressed so as to partially close the valve ports, the extent of such closing being determined by the circumstances, and the normal tendency of the engine being to move the vehicle backward, the increased resistance in the cylinders to the passage of the liquid serves to overcome the motive power applied through the transmission, and the gears 29 turning on the gear 24.

Any suitable liquid supplying means may be used in connection with my clutch and brake mechanism and any number of cylinders may be used which may be conveniently mounted within the inner rim of the fly wheel, and though the relative sizes of the gears 24 and 29 may be changed, or intermediate pinions may be placed between them, it is deemed expedient to limit the movement of the pistons, as shown to correspond with the pistons in the engine, thus providing against excessive wear and tear and insuring a greater life to the entire mechanism.

I provide a cover 75 for inclosing my entire operating mechanism, which is secured to the fly wheel 2 by means of a suitable number of cap screws 76 through the flange 77, and this cover serves to catch whatever leakage may result from the cylinders 7 and to hold the same for lubricating the pistons and gears. The cover 75 is preferably extended at 75' on its outer and central portion and bored out so as to provide a running fit over the flange 11 of the head in order that the oil held within the cover may not escape. This portion of the cover may be suitably packed, if necessary, so that the entire operating mechanism may be submerged in oil at all times to provide an easy running mechanism and minimize the friction.

It is conceived to be within the scope of my invention to alter in many respects the general form of device without departing from the spirit thereof.

Having thus described my invention, what I claim as new and desire Letters Patent for, is:

1. A variable speed transmission mechanism including a driving element, a driven element, gearing for operating the driven element by the driving element, and a plurality of hydraulic means arranged in pairs about a common liquid chamber and operable by said gearing, and means common to all of said hydraulic means for regulating the displacement of the liquid and the operation of said driven element.

2. A variable speed transmission mechanism including a driving element, a driven element, gearing between and for operating the driven element by the driving element, hydraulic means arranged in pairs and integrally supported about a common axis, and means common to all of said hydraulic means whereby the liquid may be displaced from one to the other of the units in said pairs and the displacement thereof regulated in the application of power to said driven element.

3. A variable speed transmission mechanism including a constantly rotating driving element, a selectively operable driven element, gearing for operably connecting the driving and driven elements, hydraulic means operable by said gearing and arranged in pairs on diametrical lines relative to and about a centrally formed liquid chamber common to all of said hydraulic means, and means common to all of said hydraulic means for regulating the displacement of the liquid in and through said chamber and the application of power to the driven element.

4. A variable speed transmission mechanism including a driving element, a driven element, gearing for operably connecting said elements, hydraulic elements operable by said gearing and arranged in pairs about and communicating with a common centrally formed liquid chamber, and means in said chamber common to all of said hydraulic means for regulating the displacement of the liquid and controlling the operation of said driven element.

5. A variable speed transmission mechanism including a constantly rotating driving element, a selectively operable driven element, gearing for operably connecting said elements, hydraulic elements arranged in opposite sets about the axis of said driving element and operable by said gearing, and means common to all of said hydraulic elements for regulating the operation of said driven element.

6. A variable speed transmission mechanism including a constantly rotatable driving element, a selectively operable driven element, gearing for operably connecting said elements, opposed sets of intercommunicating hydraulic elements arranged radially about the axis of said driving element and operable by said gearing, and means common to all of said hydraulic elements for regulating the operation of said driven element.

7. A variable speed transmission mechanism including a constantly rotatable driving element, a selectively operable driven element, gearing for operably connecting said elements, opposed sets of intercommunicating hydraulic elements arranged radially about and communicating with a common liquid chamber in axial alinement with said driving element for displacing the liquid from one to the other of said units of said sets through said chamber, and means for regulating the operation of said driven element.

8. A variable speed transmission mechanism including a driving element, a driven element, planetary gearing for operably connecting said elements, opposed communicating sets of hydraulic elements operable by said gearing for displacing the liquid therein, and means common to and for simultaneously regulating the displacement of the liquid and the operation of said driven element.

9. A variable speed transmission mechanism including a driving element, a driven element, gearing for operably connecting said elements, sets of opposed hydraulic elements operated by said gearing, radially arranged and intercommunicating, valve means common to all of said hydraulic elements for regulating the operation thereof, and means for operating said valve means for controlling the operation of said driven element.

Signed at Los Angeles, Cal., June 15, 1915.

LEON B. WISE.

Witnesses:
J. D. HASKIN,
ANNE HARTENSTEIN.